(12) United States Patent
Cheng et al.

(10) Patent No.: US 8,094,414 B1
(45) Date of Patent: Jan. 10, 2012

(54) HEAD GIMBAL ASSEMBLY MOUNTING MECHANISM

(75) Inventors: Chunjer C. Cheng, Saratoga, CA (US); Xiaoyang Shen, Corona, CA (US); Tao Lin, Santa Clara, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 312 days.

(21) Appl. No.: 12/500,546

(22) Filed: Jul. 9, 2009

(51) Int. Cl.
*G11B 5/55* (2006.01)

(52) U.S. Cl. .................................. 360/266.1; 360/244.5

(58) Field of Classification Search ............... 360/244.5, 360/264.7, 265.9, 266, 266.1
See application file for complete search history.

(56) References Cited

U.S. PATENT DOCUMENTS

| | | | | |
|---|---|---|---|---|
| 4,943,875 A * | 7/1990 | Reidenbach et al. | ...... | 360/245.2 |
| 4,947,275 A * | 8/1990 | Hinlein | ...... | 360/244.5 |
| 5,062,018 A * | 10/1991 | Yaeger | ...... | 360/244.6 |
| 5,296,984 A * | 3/1994 | Fick | ...... | 360/244.5 |
| 5,339,702 A | 8/1994 | Viches | | |
| 5,491,413 A | 2/1996 | Guzik | | |
| 5,495,375 A * | 2/1996 | Baasch et al. | ...... | 360/266.1 |
| 5,696,653 A | 12/1997 | Lacey | | |
| 5,715,117 A * | 2/1998 | Brooks | ...... | 360/244.5 |
| 5,731,932 A * | 3/1998 | Crane | ...... | 360/244.5 |
| 5,771,139 A | 6/1998 | Lee et al. | | |
| 5,781,380 A * | 7/1998 | Berding et al. | ...... | 360/264.2 |
| 5,786,677 A | 7/1998 | Marr | | |
| 5,844,420 A | 12/1998 | Weber et al. | | |
| 5,862,019 A * | 1/1999 | Larson | ...... | 360/265.8 |
| 5,946,164 A * | 8/1999 | Tracy | ...... | 360/244.5 |
| 6,038,755 A | 3/2000 | Mendel et al. | | |
| 6,061,896 A * | 5/2000 | Tracy | ...... | 29/603.03 |
| 6,078,469 A * | 6/2000 | Girard | ...... | 360/266.1 |
| 6,140,661 A | 10/2000 | Nodelman | | |
| 6,150,813 A | 11/2000 | Schadewald, Jr. et al. | | |
| 6,157,521 A * | 12/2000 | Utsunomiya | ...... | 360/294.5 |
| 6,166,886 A * | 12/2000 | Toensing | ...... | 360/244.5 |
| 6,236,201 B1 | 5/2001 | Kilicci et al. | | |
| 6,324,130 B1 * | 11/2001 | Hatam-Tabrizi et al. | .. | 369/13.17 |
| 6,346,809 B1 | 2/2002 | Karam, II | | |
| 6,392,844 B1 * | 5/2002 | Summers | ...... | 360/245.5 |
| 6,407,888 B1 * | 6/2002 | Crane | ...... | 360/244.5 |
| 6,417,993 B1 * | 7/2002 | Kant et al. | ...... | 360/244.6 |
| 6,459,260 B1 | 10/2002 | Bonin et al. | | |
| 6,472,866 B2 | 10/2002 | Aslami | | |
| 6,493,186 B1 * | 12/2002 | Segar et al. | ...... | 360/244.5 |
| 6,510,752 B1 | 1/2003 | Sacks et al. | | |
| 6,531,867 B1 | 3/2003 | Greene et al. | | |
| 6,571,454 B1 | 6/2003 | Haney et al. | | |
| 6,708,389 B1 | 3/2004 | Carlson et al. | | |
| 7,061,235 B2 | 6/2006 | Guzik et al. | | |
| 7,129,702 B2 | 10/2006 | Mori et al. | | |

(Continued)

*Primary Examiner* — Brian Miller (57) ABSTRACT

An apparatus for detachably mounting a head gimbal assembly to an actuator coil assembly is described. The apparatus includes a lever pivotally connected to an upper surface of an arm of the actuator coil assembly and operable to pivot between a release position and a mount position. A capture pin extends from the lever into a mounting hole of the arm. The capture pin is substantially perpendicular to the lever and is collectively pivotable with the lever between the release position and the mount position. A spring is arranged to exert a force on the lever in a direction from the release position to the mount position. The capture pin is configured to engage the head gimbal assembly positioned on a lower mounting surface of the arm opposite the upper surface of the arm via the mounting hole and to press the head gimbal assembly into the arm when in the mount position.

21 Claims, 5 Drawing Sheets

U.S. PATENT DOCUMENTS

| | | | |
|---|---|---|---|
| 7,135,861 B2 | 11/2006 | Mori et al. | |
| 7,159,299 B1 * | 1/2007 | McMunigal et al. | 29/603.03 |
| 7,183,762 B2 | 2/2007 | Yamamoto | |
| 7,194,802 B2 | 3/2007 | Fayeulle et al. | |
| 7,196,512 B2 | 3/2007 | Kainuma et al. | |
| 7,207,097 B2 * | 4/2007 | Detjens et al. | 29/603.06 |
| 7,248,039 B2 | 7/2007 | Green et al. | |
| 7,288,935 B2 | 10/2007 | Farren et al. | |
| 7,429,857 B2 | 9/2008 | Guzik et al. | |
| 7,452,213 B2 | 11/2008 | Herdendorf et al. | |
| 7,471,488 B1 * | 12/2008 | Zhang | 360/244.5 |
| 7,502,204 B2 * | 3/2009 | White et al. | 360/244.5 |
| 7,542,240 B1 * | 6/2009 | Bjorstrom et al. | 360/244.5 |
| 7,889,459 B2 * | 2/2011 | Lee et al. | 360/244.5 |
| 2003/0042895 A1 | 3/2003 | Mihara et al. | |
| 2006/0152856 A1 | 7/2006 | Zhao et al. | |
| 2006/0236527 A1 | 10/2006 | Davis et al. | |
| 2007/0046286 A1 | 3/2007 | Umezaki et al. | |
| 2007/0136022 A1 | 6/2007 | Anderson et al. | |
| 2007/0143053 A1 | 6/2007 | Holwell et al. | |
| 2007/0143054 A1 | 6/2007 | Anderson et al. | |
| 2007/0143055 A1 | 6/2007 | Anderson et al. | |
| 2007/0143056 A1 | 6/2007 | Anderson et al. | |
| 2007/0205763 A1 | 9/2007 | Yamasaki | |
| 2008/0060445 A1 | 3/2008 | Obergfell et al. | |
| 2008/0061776 A1 | 3/2008 | Collins et al. | |
| 2008/0062564 A1 | 3/2008 | Warn | |
| 2008/0247091 A1 | 10/2008 | Guzik et al. | |

* cited by examiner

HEAD GIMBAL ASSEMBLY MOUNTING MECHANISM

FIELD

The present disclosure generally concerns a hard drive component tester and, in particular, is directed to a mechanism for detachably mounting a head gimbal assembly to an actuator.

BACKGROUND

Component testing plays an important role during the manufacture and assembly of hard drives. Testing individual components allows the manufacturer to determine whether specifications of a new design have been met prior to incorporating the new component into a fully assembled hard drive. Testing representative component samples provides a measure of quality control that may prevent the wasteful assembly of a large number of hard drives using a faulty batch of components. However, many conventional hard drive component testing systems fail to create a testing environment similar to that experienced by components in an operating hard drive. Accordingly, these conventional systems are limited in the number and range of parameters that can be tested before the component is incorporated into a working hard drive.

Conventional testing systems typically are expensive and relatively complex systems. Conventional testing systems may cost several hundreds of thousands, and possibly millions, of dollars to purchase and maintain. This expense limits the number of testing systems a manufacturer can purchase given a limited budget, which correspondingly limits the number of components that can be tested within a given time frame. Many conventional component testing systems are complex pieces of equipment requiring special training and/or special tools to set up and operate. This complexity limits the efficiency and increases the overall costs associated with operating and maintaining the systems.

SUMMARY

The head gimbal assembly mounting mechanism described in the present disclosure is part of a hard drive component tester designed to address the foregoing deficiencies of conventional testing systems. This novel hard drive component tester is designed to use as many production hard drive components as possible to both keep down costs of the tester and to help recreate a testing environment similar to that experienced by components in an operating hard drive. As described herein, various structures from production hard drives have been modified to provide a reliable and easy to use tester.

According to one aspect of the present disclosure, an apparatus for detachably mounting a head gimbal assembly to an actuator coil assembly is described. The apparatus includes a lever pivotally connected to an upper surface of an arm of the actuator coil assembly and operable to pivot between a release position and a mount position. A capture pin extends from the lever into a mounting hole of the arm. The capture pin is substantially perpendicular to the lever and is collectively pivotable with the lever between the release position and the mount position. A spring is arranged to exert a force on the lever in a direction from the release position to the mount position. The capture pin is configured to engage the head gimbal assembly positioned on a lower mounting surface of the arm opposite the upper surface of the arm via the mounting hole and to press the head gimbal assembly into the arm when in the mount position.

According to another aspect of the present disclosure, an actuator coil assembly is described. The assembly includes an actuator body comprising an arm and a coil support. A pivot assembly is set in a bore of the actuator body and aligned with a pivot axis of the actuator coil assembly. A coil is attached to the coil support of the actuator body. A lever is pivotally connected to an upper surface of the arm of the actuator coil assembly and is operable to pivot between a release position and a mount position. A capture pin extends from the lever into a mounting hole of the arm, wherein the capture pin is approximately perpendicular to the lever and is collectively pivotable with the lever between the release position and the mount position. A spring is arranged to exert a force on the lever in a direction from the release position to the mount position. The capture pin is configured to engage the head gimbal assembly positioned on a lower mounting surface of the arm opposite the upper surface of the arm via the mounting hole and to press the head gimbal assembly into the arm when in the mount position.

According to another aspect of the present disclosure, a method for detachably mounting a head gimbal assembly to the actuator coil assembly is described. The method includes depressing a lever pivotally connected to an upper surface of an arm of the actuator coil assembly to pivot the lever to a release position. A head gimbal assembly is positioned on a lower mounting surface of the arm opposite the upper surface of the arm and the lever is released to pivot the lever to a mount position. A capture pin extending perpendicularly from the lever into a mounting hole of the arm and collectively pivotable with the lever between the release position and the mount position is configured to engage the head gimbal assembly positioned on the lower mounting surface of the arm and to press the head gimbal assembly into the arm when in the mount position.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components have been simplified or omitted from the figures to avoid obscuring the concepts of the subject technology.

Figure 1A:
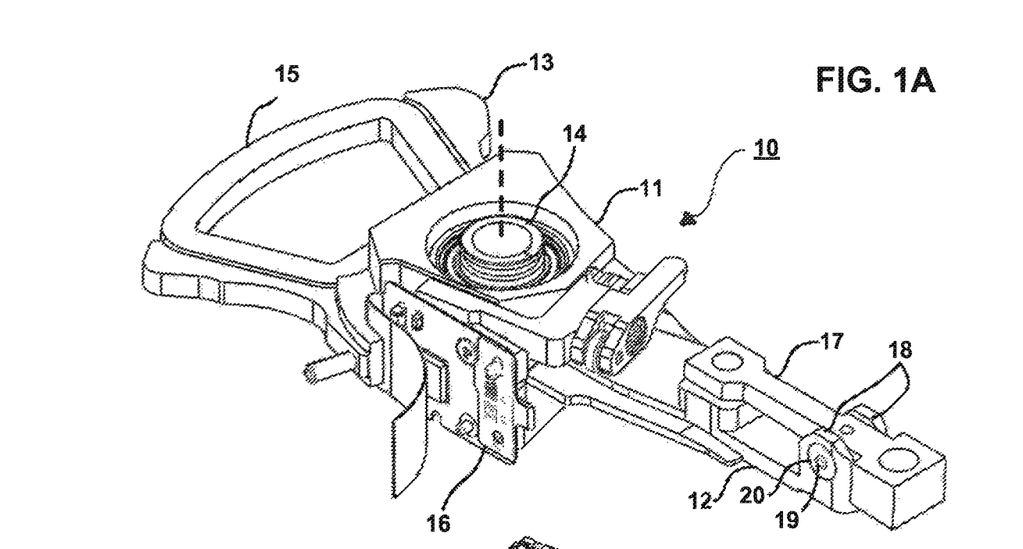
FIG. 1A is a perspective view of an actuator coil assembly according to one embodiment.

FIG. 1A is a perspective view of actuator coil assembly 10 according to one embodiment. As depicted in FIG. 1A, actuator coil assembly 10 includes actuator body 11, arm 12 and coil support 13. Actuator coil assembly 10 further includes pivot assembly 14, coil 15 and flex cable assembly 16.

Pivot assembly 14 is set in a bore located in actuator body 11. Pivot assembly 14 comprises one or more bearings which allow actuator coil assembly 10 to be pivotally mounted in a hard drive component tester. For example, pivot assembly 14 may include an outer race, which is fixed to an inner surface of the bore in actuator body 11, and an inner race, which is secured to the tester using a screw or other type of fastener, with ball or roller bearings positioned between the inner and outer races. The outer race of pivot assembly 14 may be fixed to the inner surface of the bore in actuator body 11 using a pressure fit, an adhesive, a weld, or other known techniques that prevent relative slippage between the outer race of pivot assembly 14 and the inner surface of the bore. Pivot assemblies such as the one described above are commonly used in hard drives and those skilled in the art will readily recognize the general operation of pivot assembly 14 as well as alternative structures that may be used to pivotally mount actuator coil assembly 10 in a tester that are within the contemplated scope of the subject technology.

Actuator body 11, arm 12 and coil support 13 may be machined from a single block of material to form a unitary structure. The material used to form these components may be selected from a number of different metals and metal alloys. For example, stainless steel may be used to provide a strong, rigid structure that is durable enough to withstand repeated mounting and dismounting of head gimbal assemblies for testing in the tester. Because the access speed of moving a head gimbal assembly to an intended position may not be critical in a testing environment, relatively heavy stainless steel may be used in place of conventionally used lighter materials such as aluminum and aluminum alloys. However, the scope of the subject technology is not limited to using stainless steel for these components, which may be implemented using other metals and metal alloys familiar to those skilled in the art.

Coil 15 is a coil of conductive wire, such as copper wire, arranged between and attached to prongs of coil support 13. Coil 15 may be attached to coil support 13 using any of a number of adhesives known to those of skill in the art. When actuator coil assembly 10 is pivotally mounted in a tester, coil 15 is positioned adjacent to one or more magnets which, together with coil 15, forms a voice coil motor. By controlling current flowing through the wire of coil 15, the voice coil motor may be used to pivot and precisely position actuator coil assembly 10 around a pivot axis. The pivot axis is represented in FIG. 1A by a dashed line aligned with a central axis of pivot assembly 14. The operation of the voice coil motor to position actuator coil assembly 10 may be generally the same as that used to position an actuator in a hard drive and is well known to those skilled in the art.

Flex cable assembly 16 is mounted to actuator body 11 and provides electrical connections between actuator coil assembly 10 and a printed circuit board assembly containing power and control circuits for operating actuator coil assembly 10. In particular, flex cable assembly 16 is electrically coupled to coil 15 and is arranged to be electrically coupled to a head gimbal assembly detachably mounted to actuator coil assembly 10. The power and control circuits of the printed circuit board assembly are used to position actuator coil assembly 10 and to test a detachably mounted head gimbal assembly. The printed circuit board assembly may be similar or identical to printed circuit board assemblies used in production hard drives, the configuration and operation of which are known to those skilled in the art.

Actuator coil assembly 10 described above is similar to actuator coil assemblies used in hard drives and certain components, such as pivot assembly 14 and coil 15, may be identical to those used in hard drives. However, actuator coil assembly 10 is modified to facilitate the detachable mounting of a head gimbal assembly for testing in a hard drive component tester. For example, lever 17 is pivotally connected to an upper surface of arm 12 and is operable to detachably mount a head gimbal assembly to actuator coil assembly 10. As shown in FIG. 1A, lever 17 is positioned between two supports 18 and is pivotally connected to supports 18 with pivot pin 19. Pivot pin 19 may be rotatably supported within supports 18 by bearings 20. This configuration allows lever 17 to be operable to rotate around an axis, which is represented by the dashed line in FIG. 1A, between a release position and a mount position, as described in more detail below.

Figure 1B:
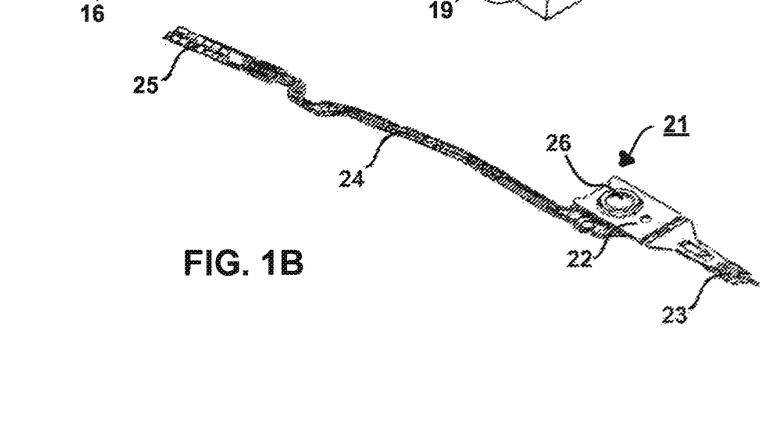
FIG. 1B is a perspective view of a head gimbal assembly according to one embodiment.

FIG. 1B is a perspective view of head gimbal assembly 21 according to one embodiment. As shown in FIG. 1B, head gimbal assembly 21 includes suspension 22, slider 23, flex trace 24 and contact pads 25. Slider 23 is mounted on suspension 22 and contains read and write heads used to read and write data onto a magnetic disk. Flex trace 24 includes conductive traces arranged on a flexible substrate and electrically coupled to the read and write heads on slider 23 at a first end. At a second end of flex trace 24 opposite the first end, the conductive traces terminate at contact pads 25, which may be electrically coupled to the printed circuit board assembly mentioned above via flex cable assembly 16. Contact pads 25 of head gimbal assembly 21 may be electrically coupled to flex cable assembly 16 using a clamping mechanism such as the clamping mechanism described in U.S. patent application Ser. No. 12/494,869 filed Jun. 30, 2009, and entitled "Dual-State Clamping Mechanism," which is hereby incorporated by reference herein. Head gimbal assembly 21 further includes alignment hole 26 defined in suspension 22. Alignment hole 26 is used to align and detachably mount head gimbal assembly 21 to actuator coil assembly 10, as described in more detail below.

Figure 2:
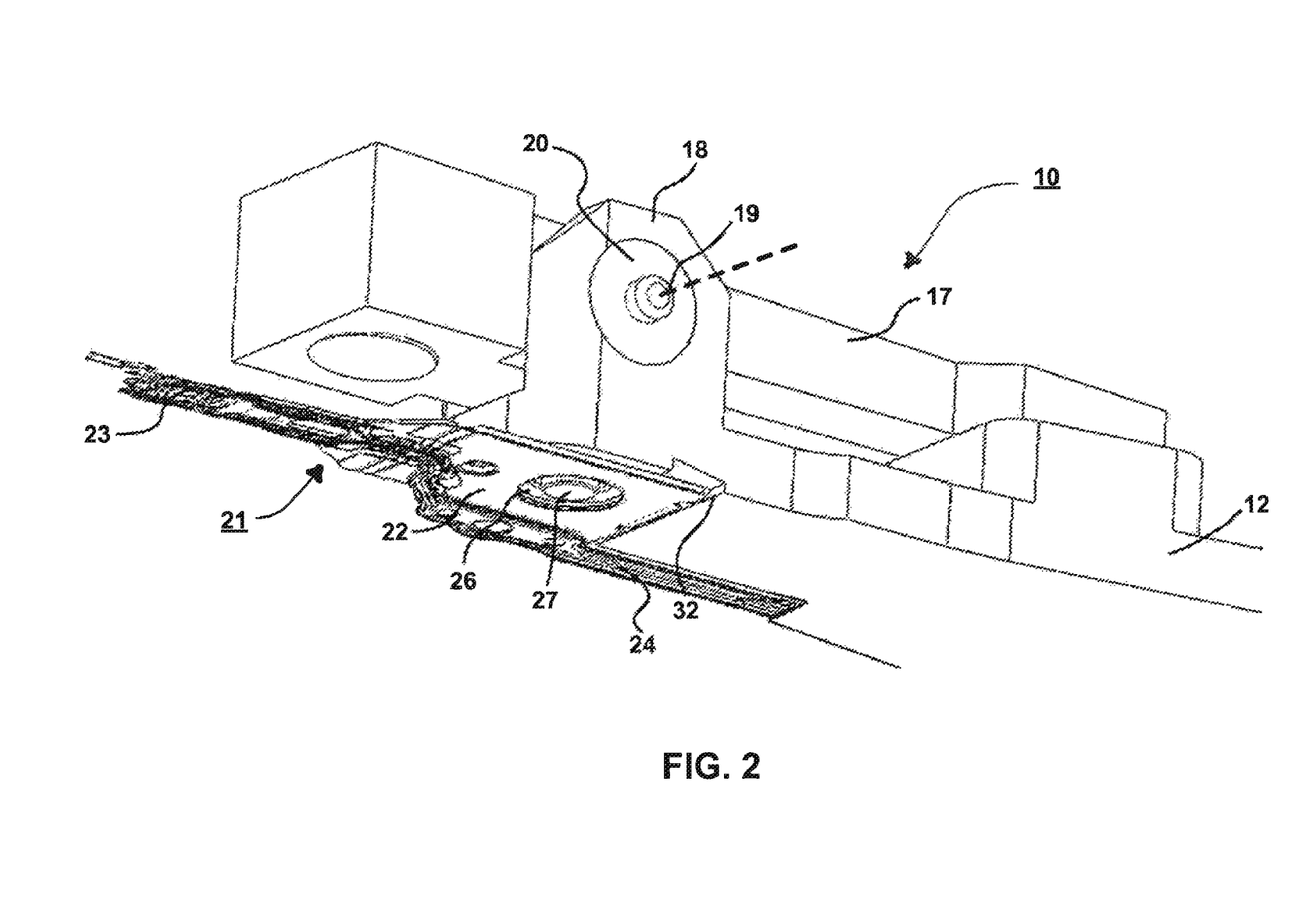
FIG. 2 is a partial perspective view of a head gimbal assembly detachably mounted to an actuator coil assembly according to one embodiment.

FIG. 2 is a partial perspective view of head gimbal assembly 21 detachably mounted to actuator coil assembly 10. As shown in FIG. 2, head gimbal assembly 21 is positioned with suspension 22 arranged adjacent to a lower mounting surface of arm 12 opposite the upper surface of arm 12 where lever 17 is pivotally connected. Head gimbal assembly 21 is positioned such that capture pin 27 extends down from lever 17 through a mounting hole defined in arm 12 and into alignment hole 26. In the release position, capture pin 27 is approximately centered in the mounting hole of arm 12 allowing head gimbal assembly 21 to be positioned on the lower surface of arm 12 with capture pin 27 extending into alignment hole 26. In the mount position, capture pin 27 engages the edge of alignment hole 26 and presses head gimbal assembly 21 into arm 12. The operation of lever 17 will now be described in more detail with reference to FIGS. 3 and 4.

Figure 3:
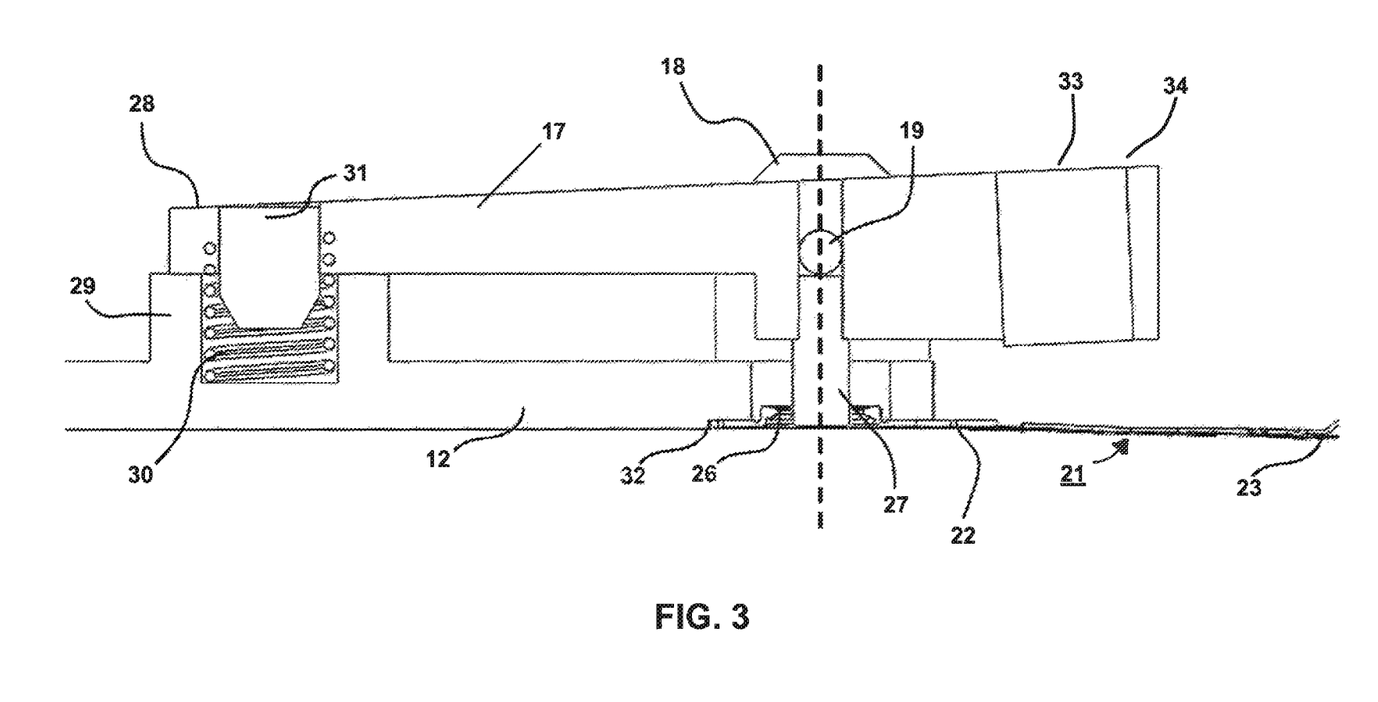
FIG. 3 is cross-sectional view of a lever pivotally connected to an actuator coil assembly in a release position according to one embodiment.

FIG. 3 is a cross-sectional view of actuator coil assembly 10 with lever 17 in a release position according to one embodiment. Lever 17 is operable to pivot to the release position when an operator depresses proximal end 28 of lever 17 to align capture pin 27 with the center of the mounting hole in arm 12 and to be approximately perpendicular with the lower mounting surface of arm 12. A central axis of capture pin 27 is depicted in FIG. 3 using a dashed line to help illustrate the relative position of capture pin 27 with respect to the lower mounting surface of arm 12. Stop 29 may be formed on the upper surface of arm 12 to limit the rotational movement of lever 17 such that lever 17 is in the release position when lever 17 rests on the upper surface of stop 29.

Spring 30 is arranged to be compressed when an operator depresses proximal end 28 of lever 17 and to exert a force on lever 17 in a direction away from arm 12 from the release position towards a mount position. Together with spring stay 31 arranged in proximal end 28 of lever 17, stop 29 houses spring 30 and keeps spring 30 aligned with lever 17 as lever 17 is operated to rotate between the release position and the mount position. Spring 30 is depicted in FIG. 3 as a coil spring. Those skilled in the art will recognize other types and configurations of springs that may be used to exert a force on lever 17 to return lever 17 from the release position to the mount position when proximal end 28 of lever 17 is released by an operator.

Similar to the view described above with respect to FIG. 2, FIG. 3 depicts head gimbal assembly 21 positioned with suspension 22 arranged adjacent to the lower mounting surface of arm 12. The cross-sectional view in FIG. 3 shows alignment hole 26 having a raised edge surrounding its perimeter, which when positioned within the mounting hole in arm 12 provides an initial stage of alignment for head gimbal assembly 21. When lever 17 is in the release position, capture pin 27 is approximately centered within the mounting hole of arm 12 and approximately perpendicular to the lower mounting surface of arm 12. This positioning of capture pin 27, together with the raised edge of alignment hole 26, allows an operator to easily position head gimbal assembly 21 on the lower mounting surface of arm 12 while depressing the proximal end 28 to hold lever 17 in the release position.

Figure 4:
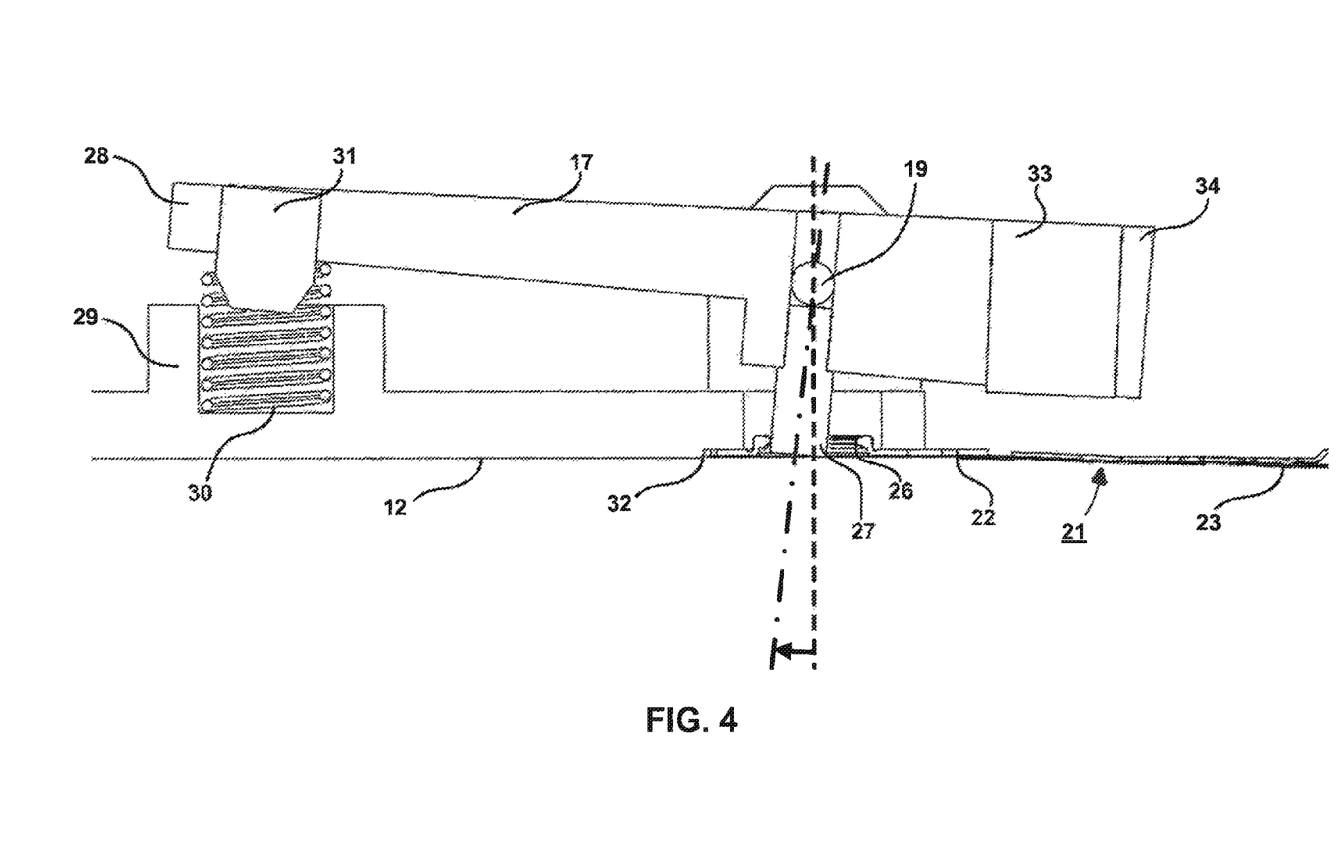
FIG. 4 is a cross-sectional view of a lever pivotally connected to an actuator coil assembly in a mount position according to one embodiment.

When the operator releases the proximal end 28 of lever 17, the force of spring 30 pushes lever 17 to pivot around the rotational axis of pivot pin 19 from the release position to the mount position. FIG. 4 is a cross-sectional view of actuator coil assembly 10 with lever 17 in the mount position according to one embodiment. The relative positioning of capture pin 27 is illustrated using a dashed line corresponding to the central axis of capture pin 27 in the release position and a dotted-dashed line corresponding to the central axis of capture pin 27 in the mount position. As capture pin 27 rotates along the arc, which is illustrated using an arrow between the dashed line and the dotted-dashed line, between the release position and the mount position, capture pin 27 engages the edge of alignment hole 26 and presses head gimbal assembly 21 into the lower mounting surface of arm 12 using the force exerted by spring 30.

Because capture pin 27 moves along an arc as lever 17 pivots between the release position and the mount position, the tip of capture pin 27 moves toward the lower mounting surface of arm 12 and toward stop 32 formed in arm 12. Accordingly, force is exerted on head gimbal assembly 21 in multiple directions with respect to arm 12. For example, capture pin 27 engages the edge of alignment hole 26 and presses head gimbal assembly 21 in a direction parallel to the lower mounting surface of arm 12 until suspension 22 rests against stop 32 formed in arm 12. As shown in FIG. 2, there may be two or more edge portions of suspension 22 that rest against stop 32 to provide stability in two dimensions within the plane of the lower mounting surface of arm 12.

The length of capture pin 27 is designed such that the tip of capture pin 27 extends down below a lip formed on the raised edge of alignment hole 26. As capture pin 27 moves along the arc from the release position to the mount position towards the lower mounting surface of arm 12, capture pin 27 engages the raised edge of alignment hole 26 on a lower portion of the lip and presses head gimbal assembly 21 into the lower mounting surface of arm 12 in a direction perpendicular to the lower mounting surface using the force exerted by spring 30.

As mentioned above, capture pin 27 is perpendicular to the lower mounting surface of arm 12 when lever 17 is in the release position. In practice, capture pin 27 may vary by up to several degrees from perpendicular to the lower mounting surface of arm 12 so long as the arc traveled by capture pin 27 allows capture pin 27 to engage alignment hole 26 and press head gimbal assembly 21 into arm 12 in the multiple directions discussed above.

Capture pin 27 may be made from a strong, durable material, such as stainless steel, that can withstand repeatedly coming into contact with alignment holes of head gimbal assemblies mounted and dismounted to actuator coil assembly 10. Those skilled in the art will recognize other materials besides stainless steel that may be used for capture pin 27. As illustrated in FIGS. 3 and 4, capture pin 27 is set in a bore drilled through lever 17 and extends from lever 17 in a direction substantially perpendicular to lever 17. This arrangement minimizes the overall profile of actuator coil assembly 10 by allowing lever 17 to extend along arm 12 rather than away from arm 12. Minimizing the overall profile and dimensions of actuator coil assembly 10 allows it to be used in testing environments similar in size to that experienced by an actuator coil assembly in a production hard drive. It is not necessary for capture pin 27 to be exactly perpendicular to lever 17 in order to reduce the overall profile and dimensions of actuator coil assembly 10. For example, capture pin 27 may vary by up to several degrees from perpendicular to lever 17 and still achieve desirable overall profile and dimensions of actuator coil assembly 10.

Lever 17 may be made from a relatively lightweight material such as aluminum or an aluminum alloy. Using a lightweight materials helps minimize possible negative effects of having a relatively heavy mass mounted on top of arm 12 that is subjected to rapid movement and vibration. Those skilled in the art will recognize other lightweight metals or metal alloys, or other materials, that may be used in place of aluminum or aluminum alloys.

In addition to being made from a lightweight material, lever 17 may be balanced at the pivot point where lever 17 is pivotally connected to arm 12 with pivot pin 19. By aligning the center of gravity of lever 17 with the pivot point at pivot pin 19, unwanted resonance and vibrations of lever 17 during use of actuator coil assembly 10 are reduced. According to one embodiment, lever 17 is balanced by setting counterweight 33 in a bore formed in distal end 34 of lever 17. Counterweight 33 may be formed from any of a number of different materials having a greater mass than the material used to form lever 17. For example, counterweight 33 may be formed from stainless steel and set in the bore formed in lever 17 made from aluminum. Counterweight 33 may be set in the bore using an adhesive or a pressure fit. Using counterweight 33 allows the overall length of lever 17 to be reduced and still align the center of gravity of lever 17 with the pivot point.

Reducing the overall size and profile of lever 17 reduces drag and windage caused by lever 17 as actuator coil assembly 10 is positioned in the air flow over a rotating disk for testing a detachably mounted head gimbal assembly.

Figure 5:
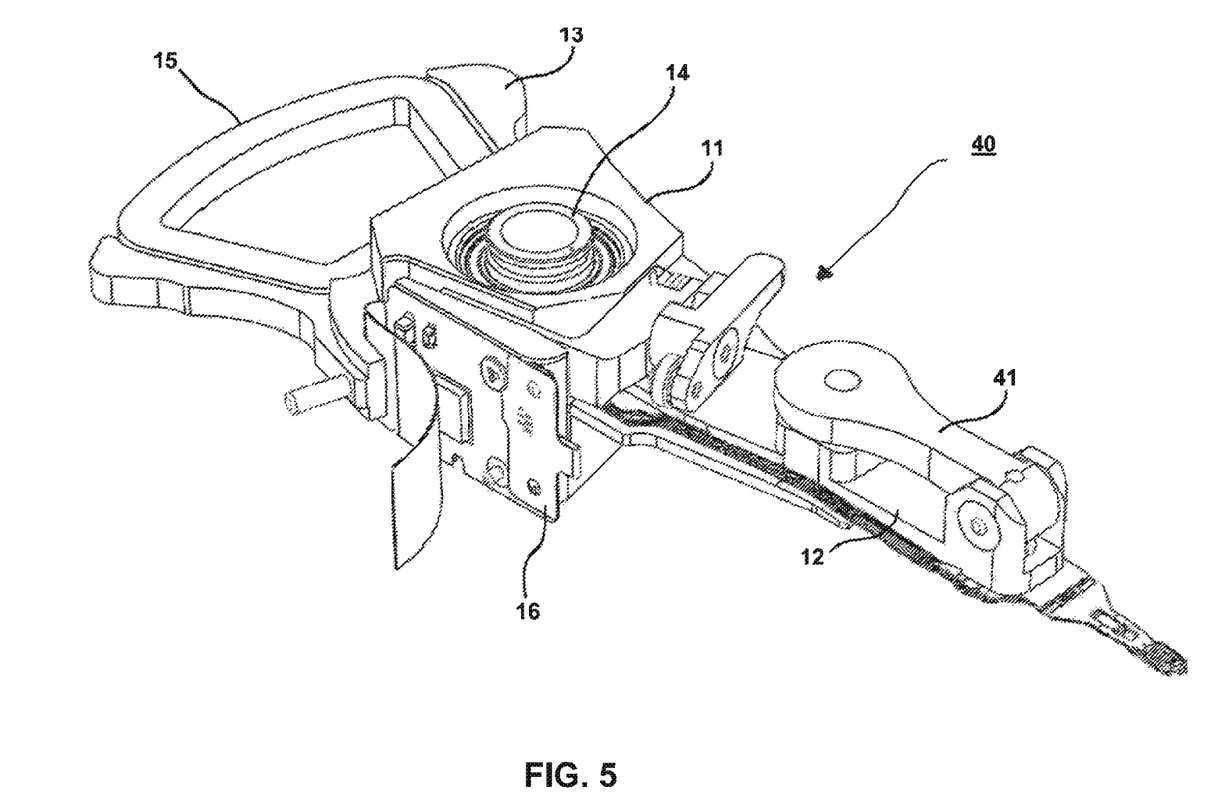
FIG. 5 is a perspective view of an actuator coil assembly according to one embodiment.

FIG. 5 is a perspective view of actuator coil assembly 40 according to an alternative embodiment. Similar to actuator coil assembly 10 described above with respect to FIG. 1, actuator coil assembly 40 includes common components such as actuator body 11, arm 12, coil support 13, pivot assembly 14, coil 15 and flex cable assembly 16. Actuator coil assembly 40 differs from actuator coil assembly 10 in the replacement of lever 17 with lever 41. As shown in FIG. 5, lever 41 does not include the portion of the lever containing a counterweight and represents a tradeoff between minimizing the size and the profile of lever 41 at the expense of not balancing lever 41 at the pivot point. The configuration and operation of actuator coil assembly 40 is primarily the same as that described above and will not be repeated.

The actuator coil assemblies described herein provide a user friendly mechanism for detachably mounting a head gimbal assembly to an actuator coil assembly. A method for an operator to detachably mount a head gimbal assembly to the actuator coil assembly includes depressing the lever pivotally connected to an upper surface of the arm of the actuator coil assembly to pivot the lever to a release position. A head gimbal assembly is positioned on the lower mounting surface of the arm opposite the upper surface of the arm and the lever is released to pivot the lever to a mount position. The capture pin extending perpendicularly from the lever into the mounting hole of the arm and collectively pivotable with the lever between the release position and the mount position is configured to engage the head gimbal assembly positioned on the lower mounting surface of the arm and to press the head gimbal assembly into the arm when in the mount position. This arrangement of the actuator coil assembly and method for detachably mounting a head gimbal assembly facilitates relatively quick and tool-free exchanges of head gimbal assemblies in a hard drive component tester. Furthermore, the overall dimensions of the actuator coil assemblies, as well as many of the components used to assemble the actuator coil assemblies, are similar or identical to actuator coil assemblies used in hard drives. Therefore, the actuator coil assemblies described herein may be used in testers that test components in an environment similar to that of a hard drive.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus for detachably mounting a head gimbal assembly to an actuator coil assembly, the apparatus comprising:
   a lever pivotally connected to an upper surface of an arm of the actuator coil assembly and operable to pivot between a release position and a mount position;
   a capture pin extending from the lever into a mounting hole of the arm, wherein the capture pin is substantially perpendicular to the lever and is collectively pivotable with the lever between the release position and the mount position; and
   a spring arranged to exert a force on the lever in a direction from the release position to the mount position,
   wherein the capture pin is configured to engage the head gimbal assembly positioned on a lower mounting surface of the arm opposite the upper surface of the arm via the mounting hole and to press the head gimbal assembly into the arm when in the mount position.

2. The apparatus according to claim 1, wherein the lever is pivotally connected to the arm of the actuator coil assembly with a pivot pin.

3. The apparatus according to claim 2, wherein the pivot pin is rotatably supported by a bearing mounted in the arm of the actuator coil assembly.

4. The apparatus according to claim 2, wherein a central axis of the capture pin intersects and is perpendicular to a rotational axis of the pivot pin.

5. The apparatus according to claim 4, wherein the central axis of the capture pin is centered in the mounting hole and is substantially perpendicular to the lower mounting surface when in the release position.

6. The apparatus according to claim 4, wherein a tip of the capture pin is configured to pivot towards the lower mounting surface of the arm and towards a stop formed in the lower mounting surface of the arm when the capture pin pivots from the release position to the mount position.

7. The apparatus according to claim 1, wherein the spring is a coil spring arranged between the lever and the upper surface of the arm of the actuator coil assembly.

8. The apparatus according to claim 1, wherein the lever is pivotally connected to the upper surface of the arm of the actuator coil assembly at a pivot point located between a proximal end of the lever and a distal end of the lever, and
wherein the center of gravity of the lever is aligned with the pivot point.

9. The apparatus according to claim 8, further comprising a counterweight set in a bore formed in the distal end of the lever.

10. An actuator coil assembly, comprising:
an actuator body comprising an arm and a coil support;
a pivot assembly set in a bore of the actuator body and aligned with a pivot axis of the actuator coil assembly;
a coil attached to the coil support of the actuator body;
a lever pivotally connected to an upper surface of the arm of the actuator coil assembly and operable to pivot between a release position and a mount position;
a capture pin extending from the lever into a mounting hole of the arm, wherein the capture pin is approximately perpendicular to the lever and is collectively pivotable with the lever between the release position and the mount position; and
a spring arranged to exert a force on the lever in a direction from the release position to the mount position,
wherein the capture pin is configured to engage the head gimbal assembly positioned on a lower mounting surface of the arm opposite the upper surface of the arm via the mounting hole and to press the head gimbal assembly into the arm when in the mount position.

11. The actuator coil assembly according to claim 10, wherein the lever is pivotally connected to the arm of the actuator coil assembly with a pivot.

12. The apparatus according to claim 11, wherein the pivot pin is rotatably supported by a bearing mounted in the arm of the actuator coil assembly.

13. The apparatus according to claim 11, wherein a central axis of the capture pin intersects and is perpendicular to a rotational axis of the pivot pin.

14. The apparatus according to claim 13, wherein the central axis of the capture pin is centered in the mounting hole and is substantially perpendicular to the lower mounting surface when in the release position.

15. The apparatus according to claim 13, wherein the capture pin is configured to pivot towards the lower mounting surface of the arm when pivoting from the release position to the mount position.

16. The apparatus according to claim 10, wherein the spring is a coil spring arranged between the lever and the upper surface of the arm of the actuator coil assembly.

17. The apparatus according to claim 16, wherein the spring is arranged in a support positioned on the upper surface of the arm of the actuator coil assembly, and wherein the support is positioned to prevent the lever from pivoting beyond the release position in a direction away from the mount position.

18. The apparatus according to claim 10, wherein the lever is pivotally connected to the upper surface of the arm of the actuator coil assembly at a pivot point located between a proximal end of the lever and a distal end of the lever, and
wherein the center of gravity of the lever is aligned with the pivot point.

19. The apparatus according to claim 18, further comprising a counterweight set in a bore formed in the distal end of the lever.

20. The apparatus according to claim 10, wherein the capture pin is configured to press the head gimbal assembly into a stop formed in the lower mounting surface of the arm of the actuator coil assembly.

21. A method for detachably mounting a head gimbal assembly to an actuator coil assembly, the method comprising:
depressing a lever pivotally connected to an upper surface of an arm of the actuator coil assembly to pivot the lever to a release position;
positioning the head gimbal assembly on a lower mounting surface of the arm opposite the upper surface of the arm; and
releasing the lever to pivot the lever to a mount position, wherein a capture pin extending perpendicularly from the lever into a mounting hole of the arm and collectively pivotable with the lever between the release position and the mount position is configured to engage the head gimbal assembly positioned on the lower mounting surface of the arm and to press the head gimbal assembly into the arm when in the mount position.

* * * * *